US012391012B2

United States Patent
Okudaira et al.

(10) Patent No.: US 12,391,012 B2
(45) Date of Patent: Aug. 19, 2025

(54) TIRE PROCESSING APPARATUS, TIRE REPAIRING APPARATUS, REPAIR SHEET, TIRE REPAIRING METHOD, AND TIRE MANUFACTURING METHOD

(71) Applicant: SUMITOMO RUBBER INDUSTRIES, LTD., Hyogo (JP)

(72) Inventors: Saki Okudaira, Hyogo (JP); Takayuki Nagase, Hyogo (JP); Masayuki Sakamoto, Hyogo (JP); Yuichi Takai, Hyogo (JP); Kotaro Hirose, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 185 days.

(21) Appl. No.: 17/925,407

(22) PCT Filed: Feb. 8, 2021

(86) PCT No.: PCT/JP2021/004648
§ 371 (c)(1),
(2) Date: Nov. 15, 2022

(87) PCT Pub. No.: WO2021/245988
PCT Pub. Date: Dec. 9, 2021

(65) Prior Publication Data
US 2023/0182420 A1  Jun. 15, 2023

(30) Foreign Application Priority Data
Jun. 3, 2020  (JP) .................................. 2020-096748

(51) Int. Cl.
*B29C 71/00*  (2006.01)

(52) U.S. Cl.
CPC ................................ *B29C 71/0009* (2013.01)

(58) Field of Classification Search
CPC ... B29C 71/0009; B29C 71/00; B29C 73/305; B29C 73/04; B29C 73/02;
(Continued)

(56) References Cited

U.S. PATENT DOCUMENTS

| 4,497,927 A * | 2/1985 | Tai ........................ C09J 121/00 524/475 |
| 2003/0127170 A1* | 7/2003 | Cottin ....................... B60C 1/00 152/209.5 |

(Continued)

FOREIGN PATENT DOCUMENTS

| CN | 102150029 A | 8/2011 |
| CN | 106079490 A | 11/2016 |

(Continued)

OTHER PUBLICATIONS

Tabata et al. (EP 1674542 B1), Jul. 1, 2009, machine translation to English (Year: 2009).*

(Continued)

*Primary Examiner* — Nahida Sultana
(74) *Attorney, Agent, or Firm* — Greenblum & Bernstein, P.L.C.

(57) ABSTRACT

A tire repairing apparatus includes: a tire support portion rotatably supporting a pneumatic tire; and an application mechanism configured to apply an additive that has a softening effect, to a tread portion of the pneumatic tire supported by the tire support portion, thereby causing the additive to permeate into the tread portion.

13 Claims, 8 Drawing Sheets

(58) Field of Classification Search
CPC ...... B29D 2030/0637; B29D 2030/544; B29D 2030/667; B29D 30/0633; B29D 30/0061
USPC ...................................................... 264/36.14
See application file for complete search history.

(56) References Cited

U.S. PATENT DOCUMENTS

| | | |
|---|---|---|
| 2010/0058851 A1 | 3/2010 | Lawrence et al. |
| 2015/0217522 A1* | 8/2015 | Ragula ..................... B05C 1/00 |
| | | 152/209.1 |
| 2017/0028660 A1* | 2/2017 | Merino Lopez ....... B29D 30/54 |

FOREIGN PATENT DOCUMENTS

| | | | | |
|---|---|---|---|---|
| CN | 106085232 A | | 11/2016 | |
| CN | 208466324 U | | 2/2019 | |
| CN | 109912974 A | * | 6/2019 | |
| CN | 111070738 A | * | 4/2020 | ............ B29C 73/10 |
| EP | 1674542 B1 | * | 7/2009 | ............ B32B 15/06 |
| JP | 2012040692 A | * | 3/2012 | |
| JP | 2013035912 A | * | 2/2013 | |
| JP | 2018-114781 | | 7/2018 | |
| WO | WO-2018224757 A1 | * | 12/2018 | ............ B29D 30/02 |

OTHER PUBLICATIONS

Mi et al. (CN 109912974 A), Jun. 21, 2019, machine translation to English (Year: 2019).*
Xu (CN 111070738 A), Apr. 28, 2020, machine translation to English (Year: 2020).*
Okubo (JP 2012040692 A), Mar. 1, 2012, machine translation to English (Year: 2012).*
El-Oulhani et al. (WO 2018224757 A1), Dec. 13, 2018, machine translation to English (Year: 2018).*
Akabori et al. (JP 2013035912 A), Feb. 21, 2013, machine translation to English (Year: 2013).*
International Preliminary Report on Patentability issued in International Pat. Appl. No. PCT/JP2021/004648, dated Dec. 6, 2022, along with an English translation thereof.
Written Opinion of the International Searching Authority issued in International Pat. Appl. No. PCT/JP2021/004648, dated Apr. 6, 2021, along with an English translation thereof.
International Search Report issued in International Pat. Appl. No. PCT/JP2021/004648, dated Apr. 6, 2021, along with an English translation thereof.
Chinese Office Action in counterpart application No. CN202180031683.5, dated Oct. 10, 2024.
Office Action in counterpart Chinese Patent Application No. 202180031683.5, dated Apr. 24, 2025.

* cited by examiner

TIRE PROCESSING APPARATUS, TIRE REPAIRING APPARATUS, REPAIR SHEET, TIRE REPAIRING METHOD, AND TIRE MANUFACTURING METHOD

TECHNICAL FIELD

The present invention relates to a tire processing technology.

BACKGROUND ART

A rubber composition that is applied to automobile tires and the like contains a rubber component (rubber material) such as SBR (styrene-butadiene rubber), as well as a reinforcing agent (carbon black, silica, etc.), sulfur, a vulcanization accelerator, an antioxidant, and the like. Especially a tread portion that comes in contact with the road surface contains a softening agent for softening the rubber component so as to retain the flexibility of the rubber and improve the basic performance such as the grip performance and the weatherability on the road surface.

Meanwhile, the main cause of the progress of tire deterioration is temporal deterioration. That is, as time passes, the softening agent gradually escapes the tire, and the rubber itself is hardened. When the rubber is hardened, the blocks and sipes formed on the tread portion are hardly bent, and the grip performance and the weatherability are deteriorated. In particular, a studless tire contains a more amount of softening agent than a normal tire (summer tire) to have the grip performance on an ice and snow road. As a result, as time passes, hardening of the rubber in the studless tire progresses more remarkably than in the normal tire. Thus, in the studless tire, with the hardening of the rubber, a ground contact surface effect and an edge effect on the ice and snow road are remarkably reduced.

Conventionally, there is known a processing method in which when a tread portion of a tire has reached a service life, the old tread portion is removed and new tread rubber is stuck thereto (see PTL 1).

CITATION LIST

Patent Literature

[PTL 1] Japanese Patent Application Publication No. 2018-114781

SUMMARY OF THE INVENTION

Problems to be Solved by the Invention

However, the conventional processing method requires a processing work such as removing and sticking a tread portion, and thus is unable to easily improve the tire performance such as the grip performance and the weatherability of the tread portion.

It is therefore an object of the present invention to provide a tire processing apparatus, a tire repairing apparatus, a repair sheet, a tire repairing method, and a tire manufacturing method that can easily improve the tire performance such as the grip performance and the weatherability of the tire.

Solution to the Problems (1) A tire processing apparatus according to an aspect of the present invention includes: a support portion supporting a tire; and an application mechanism configured to apply an additive that has a softening effect, to a tread portion of the tire supported by the support portion, thereby causing the additive to permeate into the tread portion.

With the above-described configuration, the application mechanism can cause the additive to permeate into the tread portion of the tire. This makes it possible to soften the tread portion and improve the tire performance such as the grip performance and the weatherability of the tire. It is noted that the support portion is configured to support a tire on which a wheel is not mounted, or configured to support a tire on which a wheel is mounted.

(2) The tire processing apparatus of the present invention further includes a heating portion configured to heat the tread portion.

With the above-described configuration, the application mechanism can apply the additive to the tread portion heated by the heating portion. This makes it possible to cause the additive to permeate into the tread portion more effectively.

(3) In the tire processing apparatus of the present invention, the heating portion is provided in a vicinity of the application mechanism.

With the above-described configuration, it is possible to suppress reduction in the temperature of the heated tread portion.

(4) In the tire processing apparatus of the present invention, in a case where the tire is rotated in a predetermined rotational direction, the heating portion is provided upstream of and adjacent to the application mechanism in the rotational direction.

With the above-described configuration, the tread portion is heated by the heating portion provided upstream in the rotational direction, and immediately after the heating, the application mechanism provided downstream in the rotational direction can apply the additive to the heated area. The configuration makes it possible to apply the additive to the tread portion immediately after the heated area is heated, causing the additive to permeate into the tread portion even more.

(5) In the tire processing apparatus of the present invention, the support portion supports the tire in such a manner that the tire can rotate in a predetermined rotational direction, and the application mechanism includes a contact member that applies the additive by coming in contact with a part of an outer peripheral surface of the tread portion.

With the above-described configuration, the tire is rotated, thereby it is possible to apply the additive to the entire region of the outer peripheral surface of the tread portion in a reliable manner.

(6) The tire processing apparatus of the present invention further includes a driving portion configured to impart, to the tire, a rotational driving force in the rotational direction.

With the above-described configuration, once a rotation drive is started by the driving portion, a rotation of the tire is continued until the rotation drive is stopped. This makes it possible to apply, to the outer peripheral surface of the tread portion, the additive of an amount corresponding to the number of revolutions of the tire.

(7) In the tire processing apparatus of the present invention, the contact member is a roller member that is rotatably supported in a state of being in contact with the tread portion and is passively rotated by coming in contact with the tread portion of the tire that is rotated.

With the above-described configuration, it is possible to apply the additive uniformly in the width direction of the tread portion.

(8) In the tire processing apparatus of the present invention, the application mechanism includes a pressing member configured to press a contact surface of the contact member with the tread portion against the tread portion.

With the above-described configuration, it is possible to cause the contact member to contact the tread portion with pressure. This improves the efficiency to cause the additive to permeate into the tread portion, reducing the permeation time.

(9) In the tire processing apparatus of the present invention, the pressing member is a biasing member configured to bias the contact member toward the tread portion.

With the above-described configuration, it is possible to cause the contact member to contact the tread portion with pressure by a stable biasing force of the biasing member.

(10) In the tire processing apparatus of the present invention, the pressing member is an elastic member that is provided at the contact member and is compressed by coming in contact with the tread portion.

With the above-described configuration, it is possible to cause the contact member to contact the tread portion with pressure by a stable elastic force of the elastic member.

(11) The tire processing apparatus of the present invention further includes a storage portion that stores the additive. In addition, the contact member is configured to convey the additive from the storage portion to the tread portion.

With the above-described configuration, it is possible to supply the additive stored in the storage portion to the tread portion smoothly. In this case, the contact member is preferably a liquid absorbing member that can absorb and hold the additive, such as a sponge member or a porous member. In addition, the contact member may be a roller member including the liquid absorbing member. In addition, the contact member may be a roller member including, on its outer peripheral surface, an outer peripheral layer composed of the liquid absorbing member.

(12) A tire repairing apparatus according to another aspect of the present invention includes: an idle rotation mechanism configured to idle-rotate a tire mounted on a vehicle; and an application mechanism configured to apply an additive that has a softening effect, to a tread portion of the tire rotated by the idle rotation mechanism, thereby causing the additive to permeate into the tread portion.

With the above-described configuration, the tire with a wheel mounted on the vehicle is idle-rotated by the idle rotation mechanism, thereby it is possible to apply the additive to the entire region of the outer peripheral surface of the tread portion in a reliable manner. In addition, it is possible to cause the additive to permeate into the tread portion without removing the tire from the vehicle. As a result, it is possible to soften the tread portion and improve the tire performance such as the grip performance and the weatherability of the tire.

(13) A repair sheet according to a still another aspect of the present invention is configured to be stuck to a tread portion of a tire. The repair sheet includes: an additive layer holding an additive that has a softening effect of softening the tread portion; and a support layer supporting the additive layer.

With the above-described configuration, by sticking a surface of the repair sheet on the additive layer side to the tread portion of the tire, it is possible to apply the additive to the outer peripheral surface of the tread portion in a reliable manner, and cause the additive to permeate into the tread portion. This makes it possible to soften the tread portion and improve the tire performance such as the grip performance and the weatherability of the tire. In addition, by sticking the repair sheet to a tire that is stored without use, it is possible to prevent the tire from being deteriorated over time.

(14) In the repair sheet of the present invention, the additive layer is made by coagulating the additive in a liquid state with a predetermined coagulant.

With the above-described configuration, it is possible to gradually supply the additive from the additive layer to the tread portion. It is noted that examples of the coagulant include a polymer gelling agent and a low-molecular gelling agent.

(15) A tire repairing method according to a further aspect of the present invention is to restore a hardened tread portion of a tire, and includes an additive applying step of applying an additive that has a softening effect of softening the tread portion, to the tread portion, thereby causing the additive to permeate into the tread portion.

With the above-described configuration, it is possible to cause the additive to permeate into the tread portion of the tire. This makes it possible to soften the hardened tread portion and improve the tire performance such as the grip performance and the weatherability of the tread portion.

(16) The tire repairing method of the present invention further incudes a tire rotating step of imparting a rotational driving force to the tire, thereby rotating the tire in a predetermined rotational direction. In addition, the additive applying step applies the additive to the tread portion of the tire rotated by the tire rotating step.

With the above-described configuration, the tire is rotated, thereby it is possible to apply the additive to the entire region of the outer peripheral surface of the tread portion in a reliable manner.

(17) In the tire repairing method of the present invention, in the tire rotating step, an idle rotation mechanism idle-rotates the tire mounted on a vehicle.

With the above-described configuration, it is possible to cause the additive to permeate into the tread portion without removing the tire from the vehicle.

(18) In the tire repairing method of the present invention, the additive applying step applies the additive to an entire region of an outer peripheral surface of the tread portion by causing a contact member holding the additive to come in contact with a part of the outer peripheral surface of the tread portion of the tire that is rotated.

With the above-described configuration, it is possible to apply the additive to the entire region of the outer peripheral surface of the tread portion in a reliable manner.

(19) The tire repairing method of the present invention further incudes a heating step of heating the tread portion. In addition, the additive applying step applies the additive to the tread portion heated by the heating step.

With the above-described configuration, it is possible to apply the additive to the tread portion heated by the heating step. This makes it possible to cause the additive to permeate into the tread portion more effectively.

(20) A tire manufacturing method according to a further aspect of the present invention includes a step of applying, to a tread portion of a tire after vulcanizing molding, an additive that has a softening effect of softening the tread portion, thereby causing the additive to permeate into the tread portion.

With the above-described configuration, it is possible to improve, after vulcanizing molding, the tire performance such as the grip performance and the weatherability of the tire. In addition, in the additive applying step, it is possible to arbitrarily change the tire performance such as the grip performance and the weatherability of the tire by adjusting the amount of the additive that is caused to permeate into the tread portion, or by adjusting the time of the additive applying step.

Advantageous Effects of the Invention

According to the present invention, it is possible to easily improve the tire performance such as the grip performance and the weatherability of the tread portion.

DESCRIPTION OF EMBODIMENTS

Figure 1:
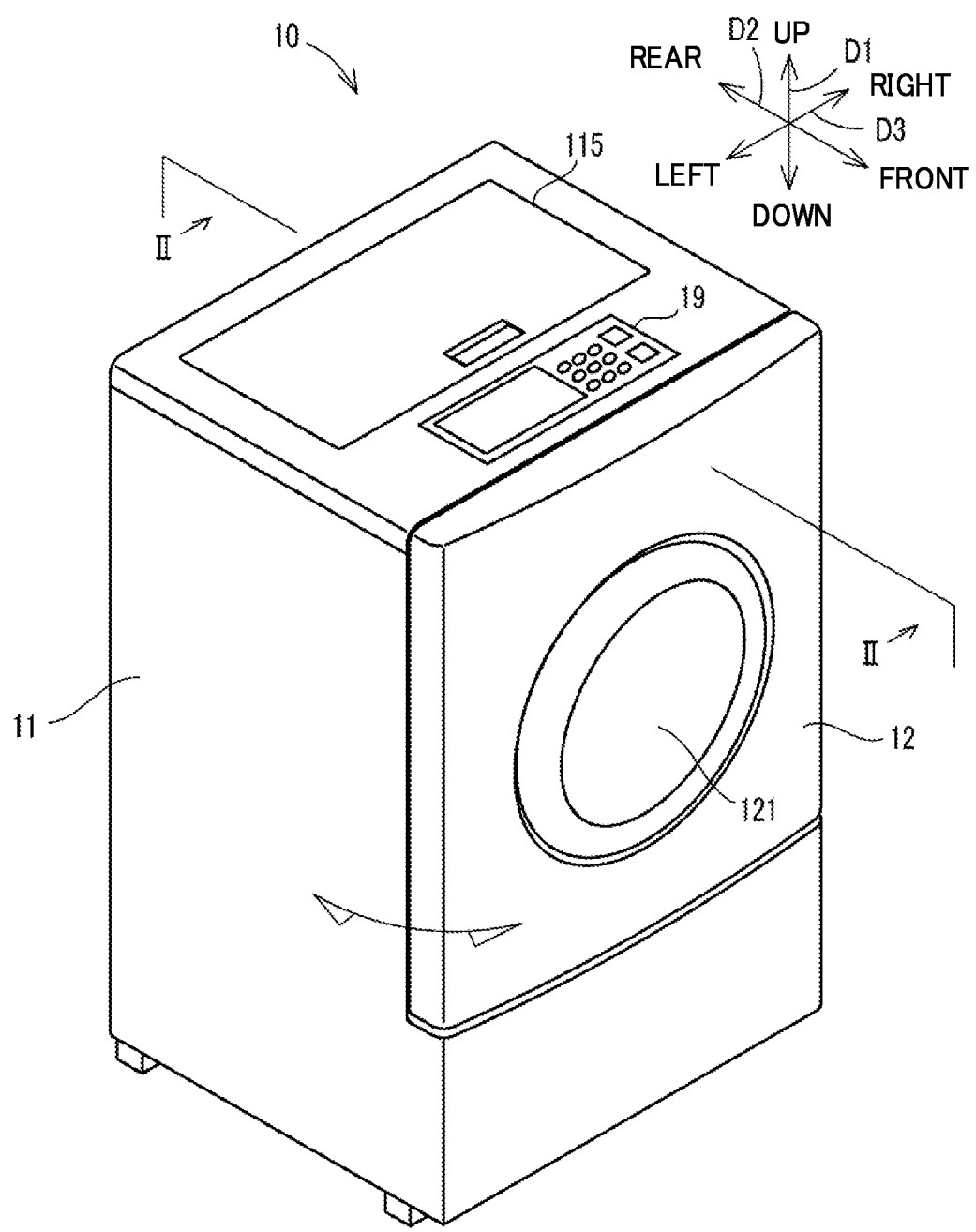
FIG. 1 is a perspective diagram showing a tire repairing apparatus according to a first embodiment of the present invention.

The following describes embodiments of the present invention with reference to the accompanying drawings. It should be noted that the following embodiments are examples of specific embodiments of the present invention and should not limit the technical scope of the present invention. It is noted that in the following description, an up-down direction D1, a front-rear direction D2, and a left-right direction, or a width direction, D3 that are shown in the drawings are used.

First Embodiment

FIG. 1 is a perspective diagram showing a front-side outer appearance of a tire repairing apparatus 10 (an example of a tire processing apparatus of the present invention) according to an embodiment of the present invention. The tire repairing apparatus 10 is configured to restore the tire performance (grip performance, weatherability, etc.) of a tread portion 5A (see FIG. 2) of a pneumatic tire (hereinafter, merely referred to as "tire") 5 that has been hardened over time.

The object to be repaired by the tire repairing apparatus 10 is the pneumatic tire 5 used in a vehicle such as a passenger car. Specifically, the object to be repaired is the pneumatic tire 5 used in various types of vehicles such as a passenger car, a large vehicle such as a truck or a bus, a motorcycle, a race car, an industrial vehicle, a special vehicle, and a vehicle for loading such as a trailer or a carrier. It is noted that although in the present embodiment, the pneumatic tire 5 for the above-mentioned vehicles is described as an example of the object to be repaired by the tire repairing apparatus 10, the object to be repaired by the tire repairing apparatus 10 is not limited thereto, but may be a non-pneumatic tire that is not filled with pressurized air, as well as a various types of tires composed mainly of a rubber component (rubber material) such as natural rubber (NR) or SBR (styrene-butadiene rubber). In addition, the tire 5 only needs to be composed of a rubber component that is used in the tire industry, and the rubber component is not limited to a particular one.

Figure 2:
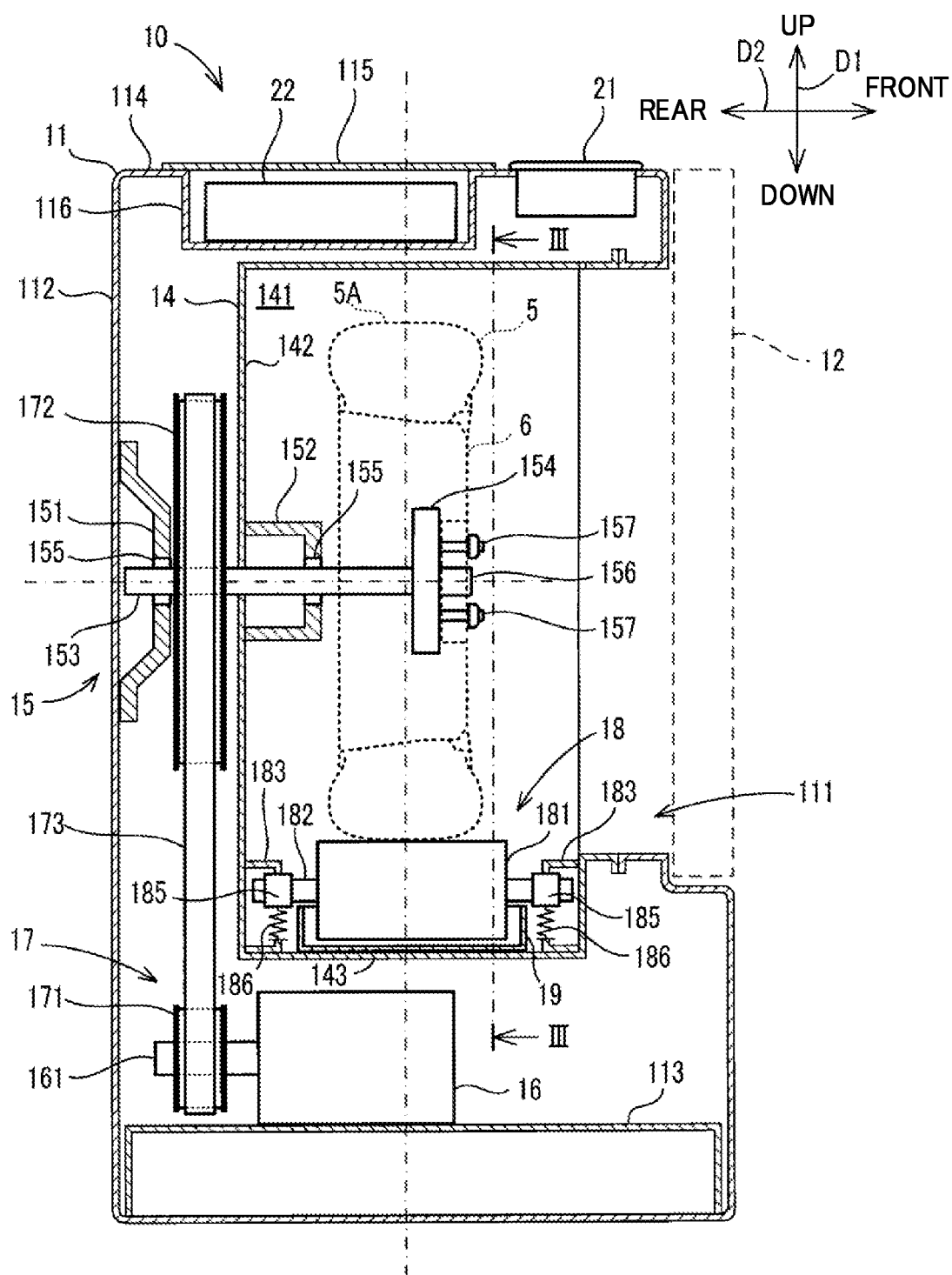
FIG. 2 is a longitudinal cross section diagram of the tire repairing apparatus.

FIG. 2 is a cross section diagram taken along a plane II-II shown in FIG. 1. As shown in FIG. 1 and FIG. 2, the tire repairing apparatus 10 includes an apparatus main body 11 as a housing, a door 12 attached to the apparatus main body 11, and function portions provided in the apparatus main body 11. The apparatus main body 11 is formed in a shape of an approximately rectangular parallelepiped box, and an opening 111 (see FIG. 2) is formed in the front surface of the apparatus main body 11. The door 12 is configured to open and close the opening 111 and is supported by the apparatus main body 11 to pivot around a right end portion of the opening 111 between a closing position (the position shown in FIG. 1) to close the opening 111 and an opening position to open the opening 111. A window 121 made of, for example, transparent resin or glass is formed in the door 12 so that the inside of the apparatus main body 11 can be observed therethrough. In a state where the door 12 is open, the tire 5 with a wheel 6, as the object to be repaired, is stored in the apparatus main body 11 through the opening 111.

In the apparatus main body 11, a tire storage portion 14, a tire support portion 15 (an example of a support portion of the present invention), a motor 16 (an example of a driving portion of the present invention), a drive transmission portion 17, an application mechanism 18 (an example of an application mechanism of the present invention), a liquid tank 19 (an example of a storage portion of the present invention), a heating portion 20 (see FIG. 3), an operation/display panel 21, and a control unit 22 are provided.

The tire storage portion 14 defines a storage room 141 for storing the tire 5 that is the object to be repaired, and is formed in a shape of a square cylinder that extends from the opening 111 rearward. The front side of the tire storage portion 14 communicates with the opening 111, and when the door 12 is locked at the closing position, the storage room 141 inside the door 12 becomes to be in a sealed state. It is noted that the tire storage portion 14 may be formed in any shape or size as far as the tire 5 can be stored in the storage room, and may be formed in a cylindrical shape (drum shape) corresponding to the shape of the tire 5.

The operation/display panel 21 is provided at an upper wall 114 of the apparatus main body 11. The operation/display panel 21 includes a display portion and an operation portion, wherein the display portion is a liquid crystal display or the like, and the operation portion is push buttons, a touch panel on which a touch input is possible, or the like. The operation/display panel 21 is configured to receive inputs, such as an operation start instruction or an operation stop instruction to the tire repairing apparatus 10, a setting value for an operation time, a setting value for a rotation speed of the tire 5 by the motor 16 that is described below, and a setting value for a heating temperature by the heating portion 20 that is described below. The Instruction or information that has been input is transferred to the control unit 22 and is used for the control by the control unit 22.

The control unit 22 is provided at an upper portion of the tire storage portion 14. A cover 115 is provided in a detachable manner at the upper wall 114, and a storage portion 116 is formed below the cover 115. The control unit 22 is provided in the storage portion 116. The control unit 22 controls the driving of the motor 16 and the heating portion 20 that are described below.

The tire support portion 15 is configured to support the tire 5 stored in the storage room 141. In the present embodiment, the tire support portion 15 supports the tire 5 in such a manner that the tire 5 can rotate in a circumferential direction. Specifically, the tire support portion 15 includes a support bracket 151, a support bracket 152, a shaft 153, and a fixing plate 154, wherein the support bracket 151 is fixed to a rear wall 112 of the apparatus main body 11, the support bracket 152 is fixed to a rear wall 142 of the tire storage portion 14, the shaft 153 passes through the rear wall 142 and is rotatably supported by the support bracket 151 and the support bracket 152, and the fixing plate 154 is used to fix the tire 5.

Each of the support bracket 151 and the support bracket 152 is provided with a rolling bearing 155 that pivotably supports the shaft 153. In addition, a through hole of the rear wall 142 through which the shaft 153 passes is provided with a seal member that keeps a gap between the rear wall 142 and the shaft 153 in a sealed state.

The fixing plate 154 in a disk shape is attached to a front end of the shaft 153. The fixing plate 154 is provided with a central shaft 156 and a plurality of bolts 157, both of which project frontward. The central shaft 156 is inserted in a center hole 6A of the wheel 6 of the tire 5 when the tire 5 is attached. In addition, the plurality of bolts 157 are inserted in a plurality of bolt holes 6B of the wheel 6. The wheel 6 of the tire 5 is attached to the fixing plate 154 and a nut is screwed to each of the bolts 157 such that the tire 5 is fixed to the fixing plate 154. This allows the tire 5 to be rotatably supported by the tire support portion 15.

The motor 16 is configured to rotate the tire 5 supported by the tire support portion 15, and is provided at a lower portion of the apparatus main body 11. Specifically, the motor 16 is provided on a bottom wall 113 of the apparatus main body 11. The motor 16 imparts a rotational driving force, in a predetermined rotational direction D11 (see FIG. 3), to the tire 5 via the drive transmission portion 17. With this configuration, when the motor 16 is driven by control, the tire 5 rotates in the rotational direction D11. The driving of the motor 16 is controlled by the control unit 22.

The drive transmission portion 17 is configured to transmit the rotational driving force output from an output shaft 161 of the motor 16 to the shaft 153 of the tire support portion 15, and the drive transmission portion 17 is provided at a rear side of the apparatus main body 11. The drive transmission portion 17 includes an output pulley 171, a belt 172, and an input pulley 173. The output pulley 171 is fixed to the output shaft 161. In addition, the input pulley 173 is fixed to the shaft 153. The belt 172 of an endless annular shape is attached to the output pulley 171 and the input pulley 173 by being wound around them. With this configuration, when the motor 16 is driven, the rotational driving force is transmitted to the tire 5 via the output pulley 171, the belt 172, the input pulley 173, the shaft 153, and the fixing plate 154, and the tire 5 rotates in the rotational direction D11.

The liquid tank 19 is configured to store an additive (an example of an additive of the present invention) in the liquid state, and is provided at the tire storage portion 14. In the present embodiment, the liquid tank 19 is provided on a bottom wall 143 of the tire storage portion 14. The additive stored in the liquid tank 19 is applied to an outer peripheral surface of the tread portion 5A of the tire 5 by the application mechanism 18, wherein the additive has a softening effect of softening the tread portion 5A. When the additive is applied to the tread portion 5A, the additive permeates into the tread portion 5A over time and enters between polymers of rubber component (rubber material) that is the primary component thereof. When the additive is oil, it increases the fluidity to improve the grip performance; and when the additive is antioxidant, it improves the weatherability. In this way, it is possible to restore the tire performance of the tread portion 5A.

The application mechanism 18 is configured to apply the additive to the tread portion 5A of the tire 5 supported by the tire support portion 15, and is provided at the tire storage portion 14. When the additive stored in the liquid tank 19 is applied to the tread portion 5A by the application mechanism 18, the additive permeates from the surface of the tread portion 5A into the tread portion 5A.

As shown in FIG. 2, the application mechanism 18 includes a rotation roller 181 (an example of a contact member and a roller member of the present invention) that applies the additive to the tread portion 5A by coming in contact with the outer peripheral surface of the tread portion 5A. The rotation roller 181 includes a rotating shaft 182 that extends in the front-rear direction D2. Bearing portions 183 are provided at the bottom wall 143 of the tire storage portion 14 to rotatably support the rotating shaft 182. The bearing portions 183 are respectively provided at opposite ends of the bottom wall 143 in the front-rear direction D2. Each of the bearing portions 183 is provided with a rolling bearing 185, and opposite ends of the rotating shaft 182 are pivotally supported by the rolling bearings 185, respectively. Thus, the rotation roller 181 is rotatably supported by the bearing portions 183.

Figure 3:
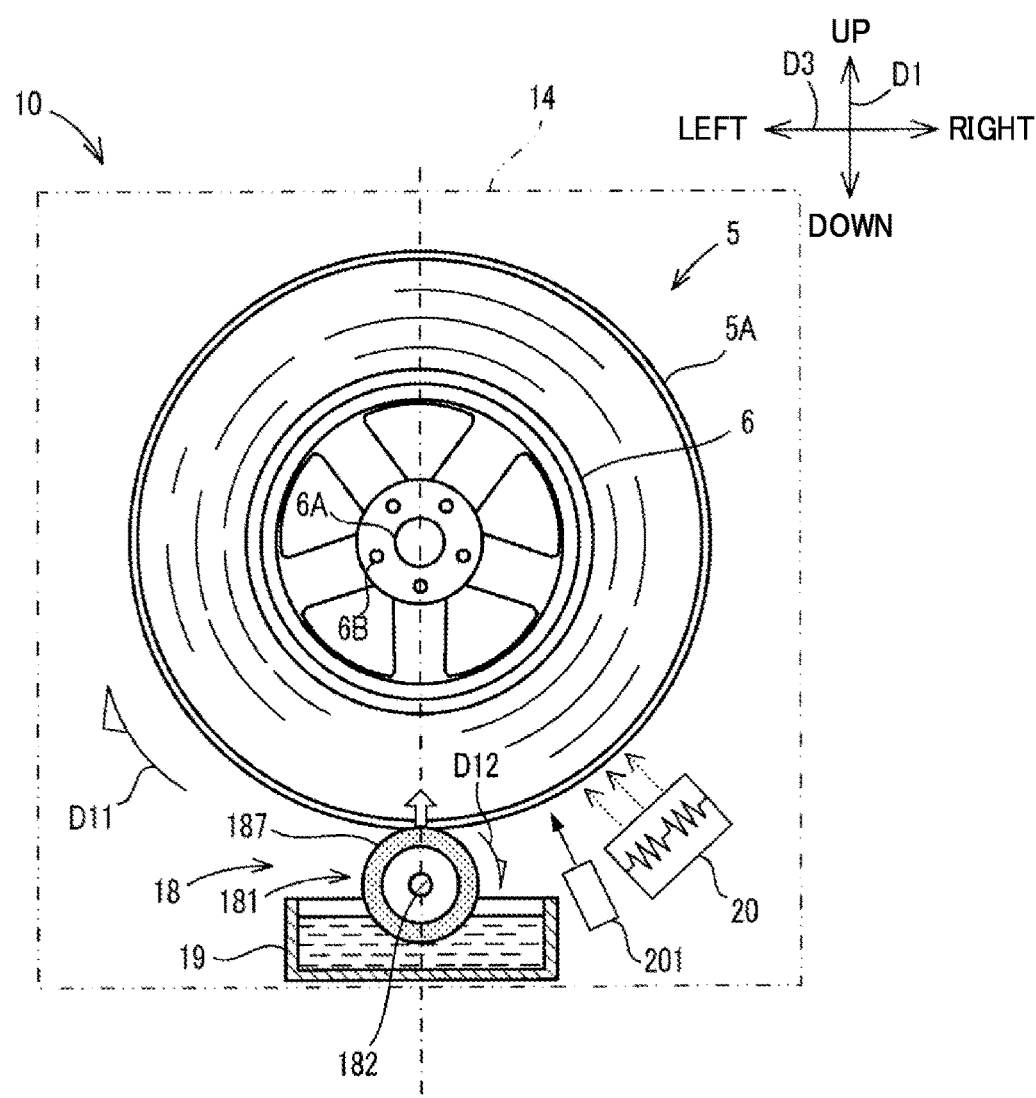
FIG. 3 is a schematic diagram showing an internal configuration of the tire repairing apparatus.

FIG. 3 is a cross section diagram taken along a line III-III shown in FIG. 2. As shown in FIG. 3, in the present embodiment, the rotation roller 181 is rotatably supported by the bearing portions 183 in a state where a roller surface of the rotation roller 181 is in contact with the outer peripheral surface of the tread portion 5A. In addition, the rotation roller 181 is rotatably supported by the bearing portions 183 in a state of being soaked in the additive stored in the liquid tank 19 located under the rotation roller 181. As a result, when the motor 16 is driven by the control unit 22, and the tire 5 is rotated in the rotational direction D11, the rotation roller 181 is passively rotated in a rotational direction D12 opposite to the rotational direction D11 of the tire 5 by the driving force transmitted from the outer peripheral surface of the tread portion 5A.

The rotation roller 181 is configured to convey the additive stored in the liquid tank 19 to the tread portion 5A. Specifically, when the rotation roller 181 passively rotates, a part of the roller surface soaked in the liquid in the liquid tank 19 reaches a contact position with the tread portion 5A while holding the additive. This allows the additive to be applied from the roller surface of the rotation roller 181 to the tread portion 5A.

The rotation roller 181 includes, at an outer peripheral portion thereof, a liquid absorbing layer 187 configured to absorb and hold the additive. The liquid absorbing layer 187 is made from any member that can absorb and hold the additive, and may be made from, for example, a sponge member, porous ceramic, a nonwoven fabric, or a mesh member made of a metal or resin. With such a configuration of the rotation roller 181, it is possible to apply the additive stored in the liquid tank 19 to the tread portion 5A in a reliable manner.

As shown in FIG. 2, the application mechanism 18 includes spring members 186 (an example of a pressing member and a biasing member of the present invention) that bias the rotation roller 181 toward the tread portion 5A. Each of the spring members 186 is what is called a compression spring. The spring members 186 are respectively provided at the bearing portions 183. The bearing portions 183 support the rotating shaft 182 such that the rotating shaft 182 can move within a predetermined movement range in the up-down direction D1. In this case, when no other external force is applied to the rotation roller 181, the spring members 186 bias the rotating shaft 182 upward so that the rotation roller 181 is disposed at the top-most position within the movement range. On the other hand, when the tire 5 is mounted to the fixing plate 154, the tread portion 5A thereof comes in contact with the roller surface of the rotation roller 181, pressing the rotation roller 181 downward, the spring members 186 are compressed against the biasing force (spring force), and the rotation roller 181 is displaced from the top-most position downward. In this state, the roller surface of the rotation roller 181 is brought into pressure contact with the tread portion 5A by the biasing force of the spring members 186, and the tread portion 5A is pressed upward.

With the above-described configuration of the application mechanism 18, it is possible to apply the additive from the roller surface of the rotation roller 181 to the tread portion 5A, while pressing the tread portion 5A upward. This improves the efficiency to cause the additive to permeate into the tread portion 5A, reducing the permeation time. In addition, since the roller surface of the rotation roller 181 is brought into pressure contact with the tread portion 5A by the biasing force of the spring members 186, it is possible to impart a pressing force that is uniform in a width direction of the tread portion 5A, and make uniform a permeation amount of the additive in the width direction.

The spring members 186 are an example of the pressing member that presses the tread portion 5A by biasing the rotation roller 181 toward the tread portion 5A. However, instead of the spring members 186, a tension spring that pulls the rotating shaft 182 upward may be provided. In addition, instead of the above-described spring members 186, an elastic member such as a rubber member may be adopted.

In addition, as the pressing member that presses the roller surface of the rotation roller 181 toward the tread portion 5A, for example, the rotation roller 181 may be composed of an elastic member such as a sponge member or a rubber member. In this case, the rotation roller 181 does not need to be supported in such a way as to be movable in the up-down direction D1, nor required are the spring members 186. For example, the rotation roller 181 may be rotatably supported at a position where the elastic member is recessed toward the rotating shaft 182 in a state of being in contact with the tread portion 5A. With this configuration, a nip portion having the same shape as an arc shape of the outer peripheral surface of the tread portion 5A is formed on the roller surface of the rotation roller 181. Thus, an elastic force is generated and imparted to the tread portion 5A when the nip portion tries to restore to the original state. This causes the roller surface of the rotation roller 181 to be pressed against the tread portion 5A. With this configuration, too, the roller surface is pressed against the tread portion 5A by a stable elastic force of the elastic member.

As shown in FIG. 3, the heating portion 20 is provided inside the apparatus main body 11. The heating portion 20 heats the tread portion 5A of the tire 5 supported by the tire support portion 15 by radiating heat to the tread portion 5A. The heating portion 20 is, for example, a heating device that radiates heat by supplying an electric current to an electric heating element such as a halogen lamp. The additive is caused to permeate into the tread portion 5A more effectively when the application mechanism 18 applies the additive to the tread portion 5A heated by the heating portion 20.

It is noted that the heating portion 20 is not limited to one that radiates heat to the tread portion 5A. For example, the heating portion 20 may be a heat roller that includes inside thereof the electric heating element. In this case, the heat roller is rotatably supported by the tire storage portion 14 in a state where the roller surface is in contact with the outer peripheral surface of the tread portion 5A of the tire 5.

The control unit 22 maintains the surface temperature of the tread portion 5A heated by the heating portion 20 to a predetermined set temperature. Specifically, a temperature sensor 201 detects the surface temperature of the tread portion 5A heated by the heating portion 20, and the control unit 22 feedback controls the heating portion 20 so that the detected temperature is equal to the set temperature.

The set temperature is, for example, 60 degrees. It is preferable that the set temperature is set to a temperature that corresponds to the additive being used.

In the present embodiment, the heating portion 20 is provided in the vicinity of the application mechanism 18. More specifically, the heating portion 20 is provided upstream of and adjacent to the application mechanism 18 in the rotational direction D11. With this configuration, it is possible to suppress reduction in the temperature of the tread portion 5A heated by the heating portion 20. In addition, the configuration makes it possible to apply the additive to a heated portion of the tread portion 5A immediately after it is heated, causing the additive to permeate into the tread portion 5A even more.

A method of repairing the tire 5 using the tire repairing apparatus 10 (tire repairing method) according to the present embodiment is a method of restoring the tire performance such as the grip performance and the weatherability of the tread portion 5A that has been hardened, and includes a tire rotating step, a heating step, and an additive applying step. It is noted that the steps described in the following may be executed in different orders as far as the same action and effect are caused. In addition, among the steps, at least the additive applying step is indispensable, and the other steps may be omitted as necessary.

After the additive is refilled into the liquid tank 19, the tire 5 is mounted to the tire support portion 15, and the door 12 is locked at the closing position, the operator operates the operation/display panel 21 to input a drive instruction. In the tire rotating step, upon the input of the drive instruction, the control unit 22 drives the motor 16, and a rotational driving force in the rotational direction D11 is transmitted to the tire 5, thereby rotating the tire 5 in the rotational direction D11.

In the heating step, upon the input of the drive instruction, the control unit 22 drives the heating portion 20, and the heating portion 20 starts to heat the tread portion 5A.

In the additive applying step, when the tire 5 is rotated in the rotational direction D11, the additive is applied to the tread portion 5A of the rotated tire 5 by the application mechanism 18. In this case, as described above, the rotation roller 181 holding the additive is caused to contact the tread portion 5A, thereby applying the additive to the entire region of the roller surface of the tread portion 5A.

It is noted that the additive applying step may be included in a manufacturing method of the tire 5 using the tire repairing apparatus 10 (the tire manufacturing method). In this case, the additive applying step applies the additive to the tread portion 5A of the tire 5 after vulcanizing molding, thereby causing the additive to permeate into the tread portion 5A.

In this case, it is possible to improve, after the vulcanizing molding, the tire performance such as the grip performance and the weatherability. In addition, in the additive applying step, it is possible to arbitrarily change the tire performance such as the grip performance and the weatherability of the tire 5 by adjusting the amount of the additive that is caused to permeate into the tread portion 5A, or by adjusting the time of the additive applying step.

As described above, the tire repairing apparatus 10 according to the present embodiment includes the application mechanism 18 that applies the additive to the tread portion 5A of the tire 5 supported by the tire support portion 15. This makes it possible for the application mechanism 18 to cause the additive to permeate into the tread portion 5A of the tire 5. With this configuration, it is possible to supply the additive to the tread portion 5A and improve the tire performance such as the grip performance and the weatherability of the tire 5.

In addition, the tire repairing apparatus 10 includes the heating portion 20 that heats the tread portion 5A. This makes it possible to apply the additive to the tread portion 5A heated by the heating portion 20. With this configuration, it is possible to cause the additive to permeate into the tread portion 5A more effectively.

In addition, since the heating portion 20 is provided in the vicinity of the application mechanism 18, it is possible to suppress reduction in the temperature of the tread portion 5A heated by the heating portion 20. Furthermore, since the heating portion 20 is provided upstream of and adjacent to the application mechanism 18 in the rotational direction D11, it is possible to apply the additive to the tread portion 5A immediately after it is heated, causing the additive to permeate into the tread portion 5A even more.

In addition, since the tire repairing apparatus 10 is configured such that the rotation roller 181 comes in contact with the tread portion 5A, it is possible to apply the additive to the tread portion 5A uniformly in a reliable manner. In addition, since the roller surface of the rotation roller 181 is brought into pressure contact with the tread portion 5A, the efficiency to cause the additive to permeate into the tread portion 5A is improved and the permeation time is reduced.

In the present embodiment, the rotation roller 181 is described as an example of a contact member of the present invention. However, the present invention is not limited to this configuration. For example, instead of the rotation roller 181, a liquid absorbing member that is flexible and configured to absorb the additive may be adopted. In this case, a lower end portion of the liquid absorbing member is soaked in the liquid in the liquid tank 19, and an upper end portion thereof is brought into pressure contact with the tread portion 5A of the tire 5. With this configuration, the additive is pumped up by a capillary phenomenon, moves to the upper end portion through the liquid absorbing member, and is applied from the upper end portion to the tread portion 5A.

In addition, according to the present embodiment, the rotation roller 181 applies the additive to the tread portion 5A by coming in contact with the tread portion 5A. However, the present invention is not limited to this configuration. For example, a configuration where the additive in the liquid tank 19 is sprayed to the tread portion 5A without contact may be adopted.

In addition, according to the present embodiment, the wheel 6 of the tire 5 is attached to the fixing plate 154 of the tire support portion 15 for fixation. However, the tire support portion 15 may be configured in such a way as to hold only the tire 5 that does not have the wheel 6. In this case, a tubular member of a cylinder shape is attached to the fixing plate 154 to support the tire 5 instead of the wheel 6.

In addition, according to the present embodiment, the tire 5 is rotatably supported by the tire support portion 15. However, the present invention is not limited to this configuration. For example, the tire storage portion 14 may be a rotating drum in a cylinder shape, and may be rotatably supported inside the apparatus main body 11. In this case, the tire 5 is fixed inside the tire storage portion 14, and in this state, upon receiving the rotational driving force from the motor 16, the tire storage portion 14 rotates. In addition, in this case, a bottom portion of the tire storage portion 14 functions as the liquid tank 19. In addition, the tire 5 is fixed to the tire storage portion 14 in a state where a lower portion of the tire 5 is always soaked in the additive stored at the bottom portion of the tire storage portion 14. With this configuration, when the tire storage portion 14 rotates together with the tire 5, the tread portion 5A of the tire 5 is continuously soaked in the additive at the bottom portion. This allows the additive to be applied to the tread portion 5A.

The following describes a suitable example of the additive having the softening effect.

The additive is intended to be supplied to the tread portion 5A. A softening agent that is commonly used for tires may be adopted as the additive. Examples of the softening agent include aromatic resin, oil such as process oil or vegetable oil, diene-based liquid polymer, and polyterpene resin. The additive itself may have the softening effect of softening the tread. When the additive does not have the softening effect, it may be mixed with another additive (for example, oil) that has the softening effect. In the latter case, the other additive corresponds to the "additive that has a softening effect of softening the tread portion" of the present invention. The additive to be supplied to the tread portion 5A may be composed of a type of additive or two or more types of additives.

The aromatic resin is polymer including aromatic compound as a constituting component. The aromatic compound may be any compound having an aromatic ring, such as: phenol compound such as phenol, alkylphenol, alkoxyphenol, or phenol containing unsaturated hydrocarbon group; naphthol compound such as naphthol, alkyl naphthol, alkoxy naphthol, or naphthol containing unsaturated hydrocarbon group; styrene derivative such as styrene, alkylstyrene, alkoxystyrene, or styrene containing unsaturated hydrocarbon group; coumarone; or indene.

In addition, for example, α-methyl styrene-based resin, coumarone-indene resin, aromatic modified terpene resin, or terpene aromatic resin may be adopted as the aromatic resin.

Examples of the α-methyl styrene-based resin include α-methyl styrene homopolymer and copolymer of α-methyl styrene and styrene. The coumarone-indene resin is resin containing coumarone and indene as monomer components that constitute the skeleton (main chain) of resin. Examples of monomer components, other than coumarone and indene, that may be included in the skeleton include styrene, methylindene, and vinyl toluene. Examples of the aromatic modified terpene resin include resin obtained by modifying terpene resin with aromatic compound (preferably styrene derivative, more preferably styrene), and resin obtained by hydrogenating this resin. Examples of the terpene aromatic resin include resin obtained by copolymerizing terpene compound and aromatic compound (preferably styrene derivative or phenol compound, more preferably styrene), and resin obtained by hydrogenating this resin.

Examples of the α-methyl styrene-based resin include SYLVARES SA85 (SYLVATRAX 4401), SA100, SA120, and SA140 (made by Kraton Corporation, USA), and FTR0100, 2120, 2140, and 7100 (made by Mitsui Chemicals, Inc.). Examples of the coumarone-indene resin include G-90 and V-120 (made by Nitto Chemical Co., Ltd.), and NOVARES 010, C30, C70, C80, C90, C100, C120, C140, and C160 (Rutgers Chemicals, Germany). Examples of the aromatic modified terpene resin include YS resin TO85, TO105, TO115, and TO125, CLEARON M125, M115, M105, K100, and K4100 (made by Yasuhara Chemical Co., Ltd.). Examples of the terpene aromatic resin include YS POLYSTER U130, U115, T160, T145, T130, T115, T100, T80, T30, S145, G150, G125, N125, K125, TH130, and UH115 (made by Yasuhara Chemical Co., Ltd.), Tamanol 803L and 901 (made by Arakawa Chemical Industries, Ltd.), and SYLVARES TP95, TP96, TP300, TP2040, TP2019, TP2040HM, TP2040LO, TP7042, TP105, and TP115 (made by Kraton Corporation, USA).

Examples of the oil include process oils, vegetable oils, and mixtures thereof. Examples of the process oils include paraffinic process oil (mineral oil) used as a plasticizer, aromatic process oil (aroma oil), and naphthenic process oil. Examples of the vegetable oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. These may be used alone, or two or more of these may be used in combination.

The diene-based liquid polymer may any diene-based polymer having a weight average molecular weight of 50,000 or less, and examples of the diene-based liquid polymer include styrene-butadiene copolymer (rubber), butadiene polymer (rubber), isoprene polymer (rubber), and acrylonitrile-butadiene copolymer (rubber).

Examples of the polyterpene resin include terpene resins such as α-pinene resin, β-pinene resin, limonene resin, dipentene resin, and β-pinene/limonene resin, as well as hydrogenated resins obtained by hydrogenating these terpene resins.

The softening agent (additive) may be a commercial product of, for example, Maruzen Petrochemical Co., Ltd., Sumitomo Bakelite Co., Ltd., Yasuhara Chemical Co., Ltd., Tosoh Corporation, Rutgers Chemicals (Germany), BASF (Germany), Kraton Corporation (USA), Nitto Chemical Co., Ltd., Nippon Shokubai Co., Ltd., JXTG Energy Corporation, Arakawa Chemical Industries, Ltd., Taoka Chemical Co., Ltd., Idemitsu Kosan Co., Ltd., Sankyo Yuka Kogyo K.K., Olisoy (Spain), H&R (Germany), Hokoku Corporation, Showa Shell Sekiyu K.K., Fuji Kosan Co., Ltd., or Daihachi Chemical Industry Co., Ltd.

In addition, what is called antioxidant may be adopted as the additive. Examples of the antioxidant include: naphthylamine antioxidants such as phenyl-α-naphthylamine; diphenylamine antioxidants such as octylated diphenylamine and 4,4'-bis(α,α'-dimethylbenzyl) diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine, quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis-[methylene-3-(3',5'-di-t-butyl-4'-hydroxyphenyl)-propionate] methane. These may be used alone, or two or more of these may be used in combination.

The antioxidant (additive) may be a commercial product of, for example, Seiko Chemical Co., Ltd., Sumitomo Chemical Co., Ltd., Ouchi Shinko Chemical Industrial Co., Ltd., or Eastman Chemical Company (USA).

In addition, what is called vulcanization accelerator may be adopted as the additive. Examples of the vulcanization accelerator include: thiazole vulcanization accelerators such as 2-mercaptobenzothiazole, di-2-benzothiazolyl disulfide, and N-cyclohexyl-2-benzothiazylsulfenamide, thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazole sulfenamide, N-t-butyl-2-benzothiazolylsulfenamide, N-oxyethylene-2-benzothiazole sulfenamide, N-oxyethylene-2-benzothiazole sulfonamide, and N,N'-diisopropyl-2-benzothiazole sulfenamide; and guanidine vulcanization accelerators such as diphenylguanidine, diorthotolylguanidine, and orthotolylbiguanidine. These may be used alone, or two or more of these may be used in combination.

In addition, what is called plasticizer may be adopted as the additive. Examples of the plasticizer include ester plasticizers such as dibutyl adipate (DBA), diisobutyl adipate (DIBA), dioctyl adipate (DOA), azelaic acid di2-ethylhexyl (DOZ), dibutyl sebacate (DBS), diisononyl adipate (DINA), diethyl phthalate (DEP), dioctyl phthalate (DOP), diundecyl phthalate (DUP), dibutyl phthalate (DBP), dioctyl sebacate (DOS), tributyl phosphate (TBP), trioctyl phosphate (TOP), triethyl phosphate (TEP), trimethyl phosphate (TMP), thymidine triphosphate (TTP), tricresyl phosphate (TCP), and trixylenyl phosphate (TXP).

The following describes, with reference to Tables 1 to 3, the action and effect of examples 1 to 9 that were obtained by repairing, by the tire repairing apparatus 10, a plurality of used tires that had been aged four years since the date of manufacture. The used tires of a comparative example 1 and the examples 1 to 9 described in the following are each a used tire (ENASAVE EC203) made by Sumitomo Rubber Industries, Ltd. aged four years since the date of manufacture.

As shown in the tables, a used tire T0 that had not been repaired by the tire repairing apparatus 10 was prepared as the comparative example 1. In addition, used tires that had been repaired by the tire repairing apparatus 10 in different conditions were prepared as the examples 1 to 9. Each of the tables shows: measurement results of a plasticizer content of the tread portion, a tire hardness, a WET grip index, and an on-ice performance index for each of the used tire T0 of the comparative example 1 and used tires T1 to T9 after repair of the examples; and repair conditions of the used tires T1 to T9. In addition, the evaluation values of the plasticizer content of the tread portion, tire hardness, WET grip index, and on-ice performance index for the used tires T1 to T9 are represented by relative evaluation values taking the evaluation value of each item for the comparative example 1 as a base of 100.

It is noted that the plasticizer content of the tread portion was measured by an acetone extraction method conforming to JIS K 6229:2015 "Rubber-Determination of solvent extract" using a small test piece cut from the surface of the tread portion. More specifically, an amount of an extract extracted from the test piece was measured based on the acetone extraction method, and the measurement result was used as the plasticizer content of the test piece. In addition, the hardness of the tread portion was measured using a hardness meter (type D durometer) conforming to JIS K 6253. In addition, the WET grip index and the on-ice performance index were measured using a chassis dynamo meter system that can reproduce rainfall and snowfall environments, a road surface freeze environment, and the like.

TABLE 1

|  | Comparative example 1 | Example 1 | Example 2 | Example 3 |
|---|---|---|---|---|
| Tire | used tire T0 | used tire T1 | used tire T2 | used tire T3 |
| Additive | — | NH-70S (aroma oil) made by Idemitsu Kosan Co., Ltd. | | |
| Repair time (hr.) | — | 4 | 15 | 24 |
| Surface temperature (° C.) | — | 60 | | |
| Plasticizer content | 100 | 123 | 143 | 177 |
| Hardness | 100 | 97 | 95 | 95 |
| WET grip index | 100 | 102 | 103 | 105 |
| On-ice performance index | 100 | 103 | 105 | 110 |

Table 1 shows the comparative example 1 and the examples 1 to 3. The example 1 is the used tire T1 that had been repaired for four hours by the tire repairing apparatus 10 while the surface temperature of the tread portion had been 60° C. The example 2 is the used tire T2 that had been repaired for 15 hours by the tire repairing apparatus 10 while the surface temperature of the tread portion had been 60° C. The example 3 is the used tire T3 that had been repaired for 24 hours by the tire repairing apparatus 10 while the surface temperature of the tread portion had been 60° C. In addition, NH-70S (aroma oil) made by Idemitsu Kosan Co., Ltd. had been used as the additive in each of the used tires T1 to T3.

As shown in Table 1, all of the examples 1 to 3 show that the plasticizer content in the used tires T1 to T3 increased after repair. This indicates that the additive had permeated into the tread portion. In addition, as the plasticizer content increased, the value of hardness of the tread portion decreased. Furthermore, the WET grip index and the on-ice performance index increased, too, as the plasticizer content increased. In addition, the examples 1 to 3 of Table 1 show that when the repair time is within a range from 4 to 24 hours, as the repair time becomes longer, the plasticizer content becomes larger, and the recovery level of the tread portion becomes larger.

TABLE 2

|  | Comparative example 1 | Example 4 | Example 5 | Example 6 |
|---|---|---|---|---|
| Tire | used tire T0 | used tire T4 | used tire T5 | used tire T6 |
| Additive | — | NH-70S (aroma oil) made by Idemitsu Kosan Co., Ltd. | | |
| Repair time (hr.) | — | 4 | | |
| Surface temperature (° C.) | — | 20 | 40 | 80 |
| Plasticizer content | 100 | 105 | 111 | 138 |
| Hardness | 100 | 98 | 97 | 95 |
| WET grip index | 100 | 100 | 101 | 103 |
| On-ice performance index | 100 | 102 | 104 | 110 |

Table 2 shows the comparative example 1 and examples 4 to 6. The example 4 is a used tire T4 that had been repaired for four hours by the tire repairing apparatus 10 while the surface temperature of the tread portion had been 20° C. The example 5 is a used tire T5 that had been repaired for four hours by the tire repairing apparatus 10 while the surface temperature of the tread portion had been 40° C. The example 6 is a used tire T6 that had been repaired for four hours by the tire repairing apparatus 10 while the surface temperature of the tread portion had been 80° C. In addition, NH-70S (aroma oil) made by Idemitsu Kosan Co., Ltd. had been used as the additive in each of the used tires T1 to T3.

As shown in Table 2, all of the examples 4 to 6 show that the plasticizer content in the used tires T4 to T6 increased after repair. In addition, as the plasticizer content increased, the value of hardness of the tread portion decreased. Furthermore, the WET grip index and the on-ice performance index increased, too, as the plasticizer content increased. In addition, the example 1 of Table 1 and the examples 4 to 6 of Table 2 show that when the repair time is constant (four hours), as the surface temperature becomes higher, the plasticizer content becomes larger, and the recovery level of the tread portion becomes larger.

TABLE 3

|  | Comparative example 1 | Example 7 | Example 8 | Example 9 |
|---|---|---|---|---|
| Tire | used tire T0 | used tire T7 | used tire T8 | used tire T9 |
| Additive | — | mineral oil | synthetic plasticizer | liquid resin |
| Repair time (hr.) | — |  | 24 |  |
| Surface temperature (° C.) | — |  | 60 |  |
| Plasticizer content | 100 | 195 | 226 | 250 |
| Hardness | 100 | 82 | 75 | 82 |
| WET grip index | 100 | 105 | 106 | 105 |
| On-ice performance index | 100 | 120 | 125 | 125 |

Table 3 shows the comparative example 1 and examples 7 to 9. The examples 7 to 9 are respectively used tires T7 to T9 that had been repaired for 24 hours by the tire repairing apparatus 10 while the surface temperature of the tread portion had been 60° C. In addition, PS-32 (mineral oil) made by Idemitsu Kosan Co., Ltd. had been used as the additive in the example 7. Bis(2-ethylhexyl)sebacate (dioctyl sebacate), being a synthetic plasticizer, made by Daihachi Chemical Industry Co., Ltd. had been used as the additive in the example 8. NOVARES 010 (liquid coumarone-indene resin), being a liquid resin, made by Rutgers Chemicals had been used as the additive in the example 9.

As shown in Table 3, all of the examples 4 to 6 show that the plasticizer content in the used tires T7 to T9 increased after repair. In addition, the example 3 of Table 1 and the examples 7 to 9 of Table 3 show that under the same repair conditions (repair time: 24 hours, surface temperature: 60° C.), when the additive is a synthetic plasticizer, the tire hardness decreased most, and the WET grip index and the on-ice performance index increased most (see the example 8). This indicates that a synthetic plasticizer, especially bis(2-ethylhexyl)sebacate (dioctyl sebacate), is suitable for the additive to be used in the tire repairing apparatus 10.

In addition, when the additive is the liquid coumarone-indene resin, the plasticizer content increased most, and the on-ice performance index increased most, too (see the example 9). In addition, although not much as the example 8, the tire hardness significantly decreased, and the WET grip index significantly increased. When the permeation amount of the additive becomes larger, the rate of escape of the additive and deterioration becomes slower, and the life of the tire after repair becomes longer. In this respect, the liquid coumarone-indene resin is most suitable for the additive, and the aromatic resin to which the liquid coumarone-indene resin belongs is suitable as well.

Second Embodiment

The following describes a repair sheet 40 (an example of the repair sheet of the present invention) according to the second embodiment of the present invention with reference to FIG. 4 to FIG. 7. It is noted that description of portions common to the above-described first embodiment is omitted. In addition, the same signs as those used in the above-described first embodiment are assigned to configurations common to the first embodiment, and description thereof is omitted.

Figure 4:
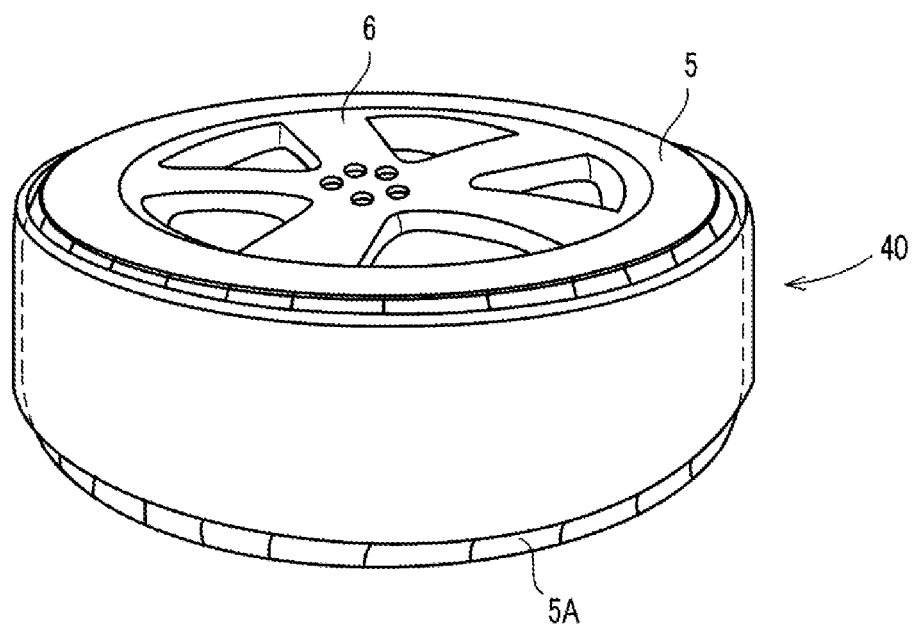
FIG. 4 is a perspective diagram showing a tire stuck with a repair sheet according to a second embodiment of the present invention.

FIG. 4 is a perspective diagram showing a tire stuck with the repair sheet 40. As shown in FIG. 4, the repair sheet 40 is formed in a sheet-like shape, and used by being stuck to the outer peripheral surface of the tread portion 5A of the tire 5 that is the object to be repaired.

Figure 5:
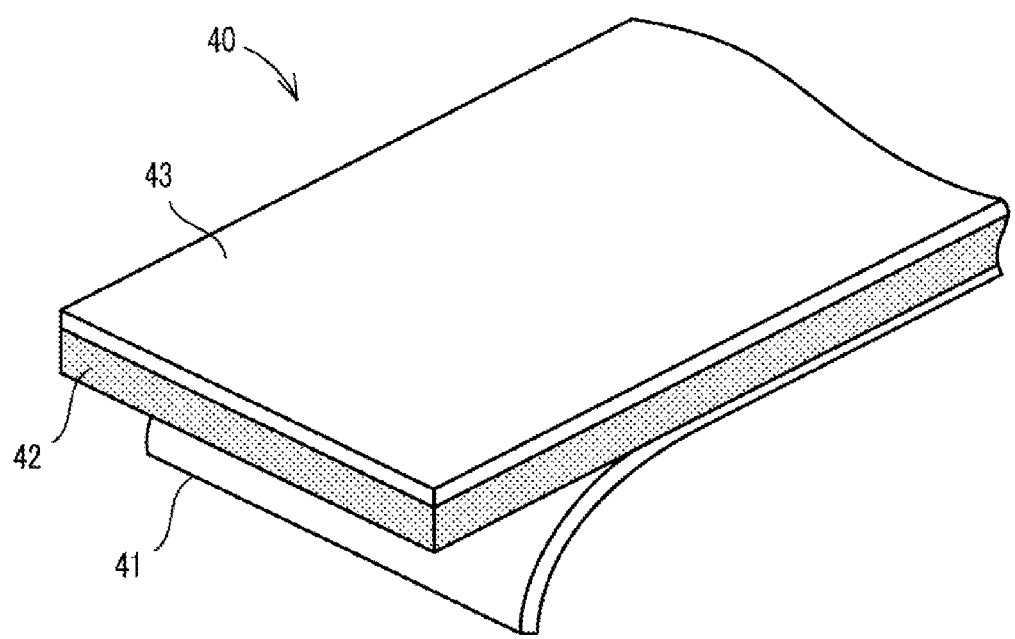
FIG. 5 is a partially enlarged diagram showing a configuration of the repair sheet.

FIG. 5 is a partially enlarged diagram showing a configuration of the repair sheet 40. As shown in FIG. 5, the repair sheet 40 includes a protection sheet 41, an additive layer 42 (an example of an additive layer of the present invention) to be stuck to the tread portion 5A, and a support member 43 (an example of a support layer of the present invention) supporting the additive layer 42.

The protection sheet 41 is configured to cover the additive layer 42 to prevent the additive contained in the additive layer 42 from leaking therefrom. The protection sheet 41 may be a known one. For example, a film sheet made of resin may be adopted as the protection sheet 41.

The additive layer 42 contains an additive that is intended to be supplied to the tread portion 5A. The additive itself may have the softening effect of softening the tread. When the additive does not have the softening effect, it may be mixed with another additive (for example, oil) that has the softening effect. In the latter case, the other additive corresponds to the "additive that has a softening effect of softening the tread portion" of the present invention. The additive layer 42 may contain a type of additive or two or more types of additives, and may contain other components as necessary. In the present embodiment, the additive layer 42 contains a coagulant for holding the additive. The coagulant improves, by itself or by an interaction with the additive, the viscosity (or hardness) of the additive and thereby coagulates the additive. Since the additive layer 42 contains the coagulant, the additive layer 42 can hold the additive while the additive keeps its surface humid. For example, a polymer gelling agent called a polymer absorbent, or a low-molecular gelling agent such as 12-hydroxystearic acid, may be adopted as the coagulant.

The support member 43 supports the additive layer 42, and prevents the repair sheet 40 from being damaged by external factors. The support member 43 may be made from any material that can support the additive layer 42, is elastic, and does not leak the additive. For example, a thick resin sheet or rubber sheet, or a coated fabric sheet may be adopted as the support member 43. It is noted that the protection sheet 41 may be the "support member" of the present invention. In this case, when the repair sheet 40 is used, the protection sheet 41 (serving as the support member) is removed before or after the additive layer 42 is stuck to the surface of the tread portion 5A.

When the repair sheet 40 with the above-described configuration is used, it is stuck, in a state where the protection sheet 41 has been removed, to the tread portion 5A of the tire 5 whose tire performance such as the grip performance and the weatherability has been deteriorated. The repair sheet 40 stuck to the tread portion 5A allows the additive to gradually ooze out from the additive layer 42, be applied to the tread portion 5A of the tire 5, and gradually permeate into the tread portion 5A. This makes it possible to supply the additive to the tread portion 5A and improve the tire performance such as the grip performance or the weatherability of the tire 5. In addition, when a normal tire that is not used in winter time, or a studless tire that is not used in summer time, is stored with the repair sheet 40 stuck to the tread portion 5A, it is possible to prevent the tire from being deteriorated in the unused period and restore the tire performance. It is noted that the additive layer 42 of the repair sheet 40 is in a state where the additive in the liquid state has been caused to have high viscosity and lose fluidity by the coagulant. As a result, when the repair sheet 40 is stuck to the surface of the tread portion 5A, the additive layer 42 changes in accordance with the tread pattern formed on the tread portion 5A. Thus, when the repair sheet 40 is stuck to the surface of the tread portion 5A, a part of the additive layer 42 is deformed and enters tread grooves formed on the tread portion 5A. This causes the additive to permeate into the tread portion 5A from side surfaces and bottom surfaces of the tread grooves as well. As a result, the additive is effectively supplied to the tread portion 5A.

Figure 6:
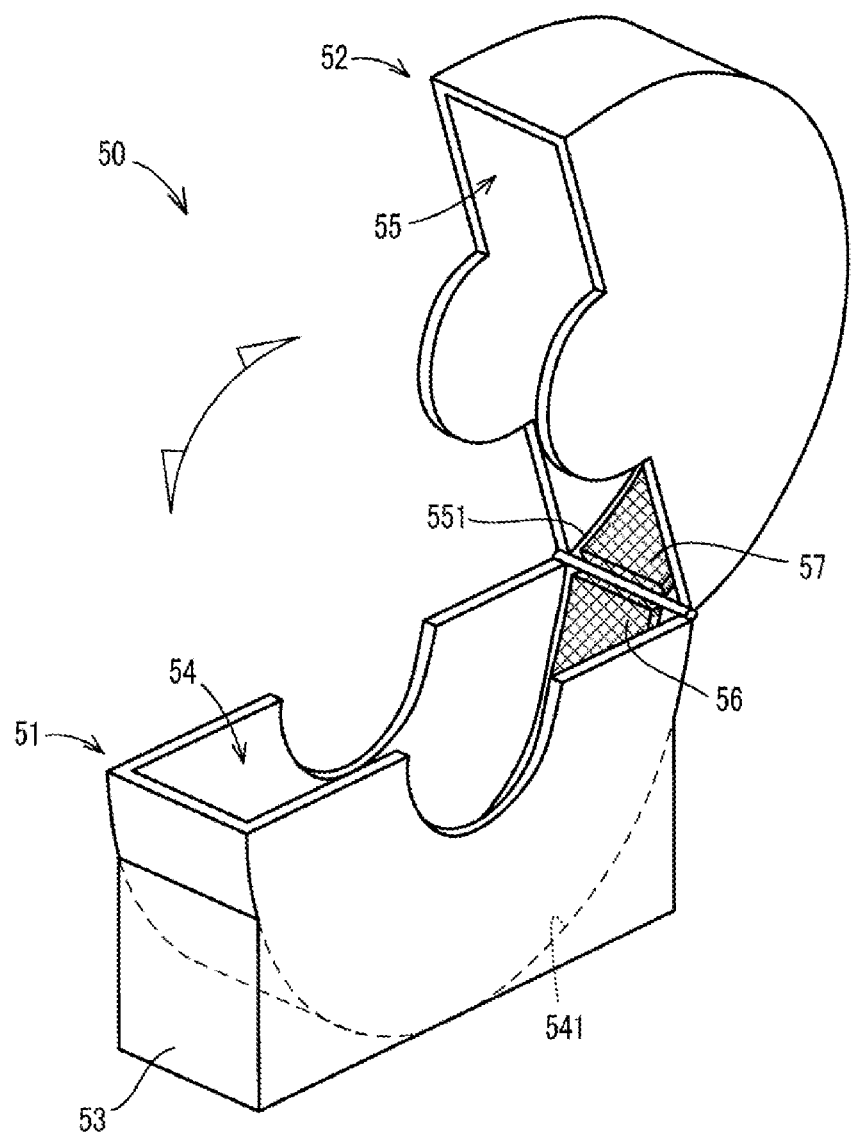
FIG. 6 is a perspective diagram of a storage case for storing the tire stuck with the repair sheet.

FIG. 6 is a perspective diagram showing a storage case 50 for storing the tire 5 that is stuck with the repair sheet 40 and is being repaired.

As shown in FIG. 6, the storage case 50 includes a lower case 51 and an upper case 52, wherein the lower case 51 is self-supported on the floor face, and the upper case 52 is pivotably supported by the lower case 51. The lower case 51 includes a base portion 53 and a storage portion 54, wherein the base portion 53 is grounded on the floor face, and the storage portion 54 is configured to store a lower half of the tire 5. A bottom surface 541 of the storage portion 54 is formed in an arc shape in correspondence with the outer peripheral shape of the tire 5. The bottom surface 541 is provided with a pressing member 56 that comes in contact with the stored tire 5. The pressing member 56, made from, for example, an elastic member such as a sponge member or a rubber member, is formed in a sheet-like shape. The pressing member 56 is stuck to the entire surface of the bottom surface 541.

The upper case 52 is formed in an arc shape in correspondence with the outer peripheral shape of the tire 5. The upper case 52 includes a storage portion 55 configured to store an upper half of the tire 5 stored in the lower case 51. An inner surface 551 of the storage portion 55 is, as the bottom surface 541, formed in an arc shape in correspondence with the outer peripheral shape of the tire 5. In addition, the inner surface 551 is provided with a pressing member 57 having the same configuration as the pressing member 56.

The lower case 51 and the upper case 52 are each, for example, a resin molded product formed by a synthetic resin that blocks ultraviolet light.

When the tire 5 being repaired is stored for a long period, the tire 5 is stored in the storage case 50. The tire 5 is first stored in the lower case 51 of the storage case 50, and then the upper case 52 is pivoted to cover the upper half of the tire 5. When the upper case 52 is completely closed, the lower case 51 and the upper case 52 are locked to each other by a lock mechanism (not shown). This allows the tire 5 being repaired to be stored in the storage case 50 in a nearly sealed state.

Figure 7:
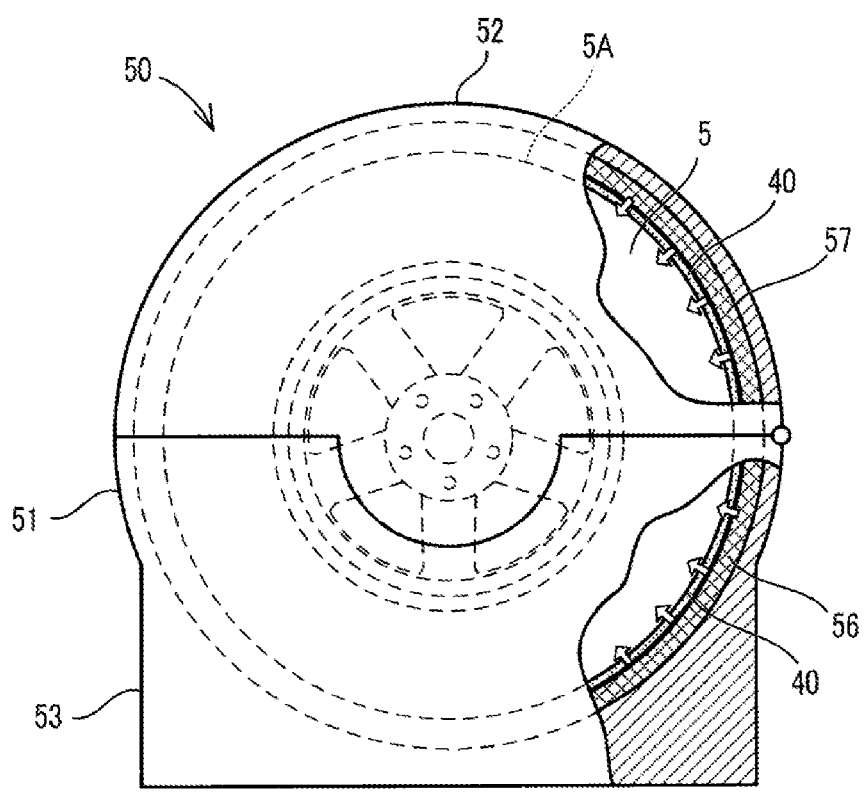
FIG. 7 is a front diagram of the storage case in which the tire is stored.

FIG. 7 shows the storage case 50 in which the tire 5 being repaired is stored. FIG. 7 shows a partial cross section of its inside. As shown in FIG. 7, when the tire 5 being repaired is stored in the storage case 50, the repair sheet 40 stuck to the tread portion 5A is brought into pressure contact with the tread portion 5A by the self-weight of the tire 5 and the elastic force of the pressing member 56. In addition, when the upper case 52 is closed, the pressing member 57 of the upper case 52 presses the repair sheet 40 towards the tread portion 5A, allowing the repair sheet 40 to contact the tread portion 5A with pressure. This causes the repair sheet 40 to come in close contact with the tread portion 5A with a uniform pressing force, making it possible to apply the additive contained the additive layer 42 to the tread portion 5A in a reliable manner. Furthermore, since it is brought into pressure contact with the tread portion 5A with a uniform force, a uniform amount of additive permeates into the tread portion 5A. In addition, the additive layer 42 is pressed against the tread grooves formed on the tread portion 5A. This allows the additive layer 42 to be partially deformed in such a way as to easily enter the tread grooves. This makes it possible to cause the additive to permeate into the tread portion 5A from side surfaces and bottom surfaces of the tread grooves more effectively.

It is noted that a heating function may be provided in order to shorten the repair time of the tire 5 stored in the storage case 50, or accelerate the permeation effect of the additive. As a configuration to provide the heating function, each of the bottom surface 541 and the inner surface 551 may be provided with an electric heating sheet, and heating of the electric heating sheet may be controlled by a control portion (not shown).

In addition, in the above-described embodiment, the storage case 50 is provided as an example of a storage means for storing the tire 5 being repaired. Not limited to this, for example, the tire 5 may be stored in a tire cover in a bag shape that blocks light.

The following describes, with reference to Tables 4 to 6, the action and effect of examples 10 to 18 that were obtained by repairing, by the repair sheet 40, the tread portions 5A of a plurality of used tires that had been aged four years since the date of manufacture. The used tires of the examples 10 to 18 were each repaired by having been stored, for a predetermined time period, in the storage case 50 in a state where the repair sheet 40 was stuck to the outer peripheral surface of the tread portion 5A. The used tires of a comparative example 2 and the examples 10 to 18 described in the following are used tires (ENASAVE EC203) made by Sumitomo Rubber Industries, Ltd. aged four years since the date of manufacture.

As shown in the tables, a used tire T20 that had not been repaired by the repair sheet 40 was prepared as the comparative example 2. In addition, used tires that had been repaired by the repair sheet 40 in different conditions were prepared as the examples 10 to 18. Each of the tables shows: measurement results of an antioxidant content of the tread portion, and an ozone resistance index for each of the used tire T20 of the comparative example 2 and used tires T10 to T18 after repair of the examples; and repair conditions for the used tires T10 to T18. In addition, the evaluation values of the antioxidant content and the ozone resistance index for the used tires T10 to T18 are represented by relative evaluation values taking the evaluation value of each item for the comparative example 2 as a base of 100.

It is noted that the antioxidant content of the tread portion was measured by an acetone extraction method conforming to JIS K 6229:2015 "Rubber-Determination of solvent extract" using a small test piece cut from the surface of the tread portion. More specifically, an amount of an extract extracted from the test piece was measured based on the acetone extraction method, and the measurement result was used as the antioxidant content of the test piece.

In addition, the ozone resistance index was evaluated by generating a test piece of a predetermined size from the surface of the tread portion in accordance with JIS K 6259 "Rubber, vulcanized or thermoplastic—Determination of ozone resistance", and performing the dynamic strain testing on the test piece. More specifically, a test for applying a reciprocating motion of frequency 0.5±0.025 Hz to the test piece for 48 hours under the conditions: ozone concentration of 50±5 pphm; test temperature of 40° C., and tensile strain of 20±2%, and, after the test, observing the state of cracks (presence/absence of cracks, the number of cracks, the length of cracks, or the like). As the evaluation method, a method (Method A: Crack state observation method) described in JIS K 6259 was used. More specifically, the number of cracks whose length is 0.05 mm or more that were detected after the test was multiplied by the average length of the cracks whose length is 0.05 mm or more to obtain a value that indicates a crack occurrence degree, and the reciprocal of the value was used as the evaluation value of the ozone resistance index. As a result, when a value is higher than the ozone resistance index "100" of the comparison example 2 that is the evaluation standard, it indicates that a less number of cracks have occurred, the size of the crack is smaller, and has an excellent ozone resistance.

TABLE 4

|  | Comparative example 2 | Example 10 | Example 11 | Example 12 |
|---|---|---|---|---|
| Tire | Used tire T20 | Used tire T10 | Used tire T11 | Used tire T12 |
| Additive | — |  | Antioxidant, oil |  |
| Repair time (days) | — | 3 | 7 | 14 |
| Storage temperature (° C.) | — | 25 | 25 | 25 |
| Antioxidant content | 100 | 209 | 432 | 560 |
| Ozone resistance index | 100 | 400 | 675 | 750 |

Table 4 shows the comparative example 2 and examples 10 to 12. The repair sheet 40 used in the examples 10 to 12 includes the additive layer 42 in which antioxidant (an example of the additive), oil (an example of the additive), and coagulant were primarily contained at a rate of 10:10:2. NOCRAC 6C, made by Ouchi Shinko Chemical Industrial Co., Ltd., having N-(1,3-dimethylbutyl)-N'-phenyl-p-phenylenediamine as the major component was used as the antioxidant. It is noted that, in common to the examples 10 to 18, PS-32 (mineral oil) made by Idemitsu Kosan Co., Ltd. was used as the oil, and hydroxystearic acid was used as the coagulant.

Used tires that had been repaired by being stored under the temperature environment of 25 degrees were prepared as the examples 10 to 12. The example 10 is the used tire T10 that had been repaired with the repair sheet 40 stuck to the tread portion for three days, the example 11 is the used tire T11 that had been repaired with the repair sheet 40 stuck to the tread portion for seven days, and the example 12 is the used tire T12 that had been repaired with the repair sheet 40 stuck to the tread portion for 14 days.

As shown in Table 4, all of the examples 10 to 12 show that the antioxidant content in the used tires T10 to T12 increased after repair. This indicates that the additive had permeated into the tread portion. In addition, as the antioxidant content increased, the ozone resistance index in the tread portion increased as well. In addition, the examples 10 to 12 of Table 4 show that when the repair time is within a range from 3 to 14 days, as the repair time becomes longer, the antioxidant content becomes larger, the ozone resistance index becomes larger, and the recovery level of the tread portion becomes larger.

TABLE 5

|  | Comparative example 2 | Example 13 | Example 14 | Example 15 |
|---|---|---|---|---|
| Tire | Used tire T20 | Used tire T13 | Used tire T14 | Used tire T15 |
| Additive | — |  | Antioxidant, oil |  |
| Repair time (days) | — | 3 | 7 | 14 |
| Storage temperature (° C.) | — | 25 | 25 | 25 |
| Antioxidant content | — | 313 | 530 | 700 |
| Ozone resistance index | 100 | 327 | 540 | 680 |

Table 5 shows the comparative example 2 and examples 13 to 15. The repair sheet 40 used in the examples 13 to 15 includes the additive layer 42 in which antioxidant (an example of the additive), oil (an example of the additive), and coagulant were primarily contained at a rate of 10:10:2. NOCRAC 224, made by Ouchi Shinko Chemical Industrial Co., Ltd., having 2,2,4-trimethyl-1,2-dihydroquinoline polymer as the major component was used as the antioxidant.

Used tires that had been repaired by being stored under the temperature environment of 25 degrees were prepared as the examples 13 to 15. The example 13 is the used tire T13 that had been repaired with the repair sheet 40 stuck to the tread portion for three days, the example 14 is the used tire T14 that had been repaired with the repair sheet 40 stuck to the tread portion for seven days, and the example 15 is the used tire T15 that had been repaired with the repair sheet 40 stuck to the tread portion for 14 days.

As shown in Table 5, all of the examples 13 to 15 show that the antioxidant content in the used tires T13 to T15 increased after repair. This indicates that the additive had permeated into the tread portion. In addition, as the antioxidant content increased, the ozone resistance index in the tread portion increased as well. In addition, the examples 13 to 15 of Table 5 show that when the repair time is within a range from 3 to 14 days, as the repair time becomes longer, the antioxidant content becomes larger, the ozone resistance index becomes larger, and the recovery level of the tread portion becomes larger. Furthermore, comparisons between the examples 10 and 13, between the examples 11 and 14, and between the examples 12 and 15 show that the recovery level of the tread portion is larger when, as the antioxidant as the additive, NOCRAC 224 is used than when NOCRAC 6C is used.

tread portion increased as well. In addition, the examples 16 to 18 of Table 6 show that when the repair time is within a range from 3 to 14 days, as the repair time becomes longer, the antioxidant content becomes larger, the ozone resistance index becomes larger, and the recovery level of the tread portion becomes larger.

Third Embodiment

Figure 8:
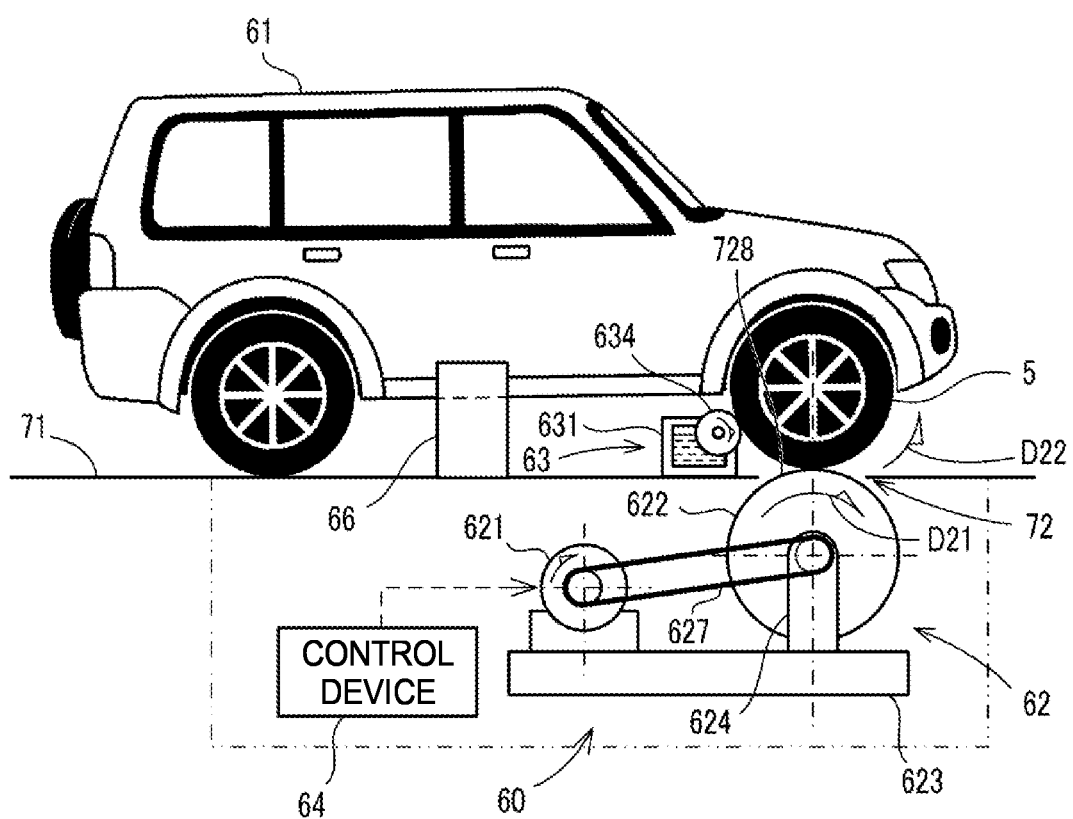
FIG. 8 is a schematic diagram showing a configuration of a tire repairing apparatus according to a third embodiment of the present invention.

The following describes a tire repairing apparatus 60 (an example of the tire processing apparatus of the present invention) according to the third embodiment of the present invention with reference to FIG. 8. It is noted that although FIG. 8 shows a vehicle 61 that is a four-wheel passenger car, the type and purpose of the vehicle 61 are not limited to specific ones. In addition, description of portions common to the above-described first embodiment is omitted. In addition, the same signs as those used in the above-described first embodiment are assigned to configurations common to the first embodiment, and description thereof is omitted.

FIG. 8 is a schematic diagram showing a configuration of the tire repairing apparatus 60. As shown in FIG. 8, the tire repairing apparatus 60 includes an idle rotation drive device 62 (an example of an idle rotation mechanism of the present invention) configured to idle-rotate the tire 5 mounted on the vehicle 61, a roller application device 63 (an example of an application mechanism of the present invention) configured to apply the additive to the tread portion 5A of the tire 5, and a control device 64 configured to control the idle rotation drive device 62.

The idle rotation drive device 62 is installed in a storage room that is formed under a floor surface 71 of a workshop where the repairing work of the vehicle 61 is performed. The

TABLE 6

|  | Comparative example 2 | Example 16 | Example 17 | Example 18 |
|---|---|---|---|---|
| Tire | Used tire T20 | Used tire T16 | Used tire T17 | Used tire T18 |
| Additive | — | — | Antioxidant, oil | — |
| Repair time (days) | — | 3 | 7 | 14 |
| Storage temperature (° C.) | — | 25 | 25 | 25 |
| Antioxidant content | — | 263 | 480 | 630 |
| Ozone resistance index | 100 | 420 | 708 | 795 |

Table 6 shows the comparative example 2 and examples 16 to 18. The repair sheet 40 used in the examples 16 to 18 includes the additive layer 42 in which antioxidant (an example of the additive), oil (an example of the additive), and coagulant were primarily contained at a rate of 10:10:2. The antioxidant used was a mixture of NOCRAC 6C and NOCRAC 224, both made by Ouchi Shinko Chemical Industrial Co., Ltd., mixed at a rate of 1:1.

Used tires that had been repaired by being stored under the temperature environment of 25 degrees were prepared as the examples 16 to 18. The example 16 is the used tire T16 that had been repaired with the repair sheet 40 stuck to the tread portion for three days, the example 17 is the used tire T17 that had been repaired with the repair sheet 40 stuck to the tread portion for seven days, and the example 18 is the used tire T18 that had been repaired with the repair sheet 40 stuck to the tread portion for 14 days.

As shown in Table 6, all of the examples 16 to 18 show that the antioxidant content in the used tires T16 to T18 increased after repair. This indicates that the additive had permeated into the tread portion. In addition, as the antioxidant content increased, the ozone resistance index in the idle rotation drive device 62 includes a motor 621, a pair of rollers 622 disposed to be separated in the width direction of the vehicle 61, and a common base 623 to which these are fixed. The pair of rollers 622 are rotatably supported by the common base 623. The pair of rollers 622 are fixed to a common rotation shaft 625, and the rotation shaft 625 is pivotably supported by a support frame 624 of the common base 623.

In a state where the roller 622 is supported by the common base 623, a part of the outer peripheral surface of the roller 622 is exposed above the floor surface 71 through an opening 72 formed in the floor surface 71. The tire 5 of the vehicle 61 is placed on an exposed portion 628 of the roller 622.

A belt 627 is wound around an output shaft 626 of the motor 621 and the rotation shaft 625 of the roller 622, wherein the belt 627 transmits the rotational driving force of the motor 621. The rotational driving force of the motor 621 is transmitted to the rotation shaft 625 via the belt 627.

The motor 621 is driven by control by the control device 64. When the motor 621 is driven by the control device 64, the roller 622 rotates in a predetermined rotation direction D21.

The roller application device 63 is configured to apply the additive to the tread portion 5A of the tire 5, and includes: a storage case 631 to store the additive in its inside; and a rotation roller 634 (an example of the contact member and the roller member of the present invention) rotatably supported by the storage case 631. The width of the rotation roller 634 is at least the same as the width of the tread portion 5A of the tire 5.

The rotation roller 634 is supported by the storage case 631 such that a part of its roller surface is soaked in the liquid in the storage case 631. As a result, when the rotation roller 634 is rotated, a soaked part of the roller surface that has been soaked in the liquid moves in the rotation direction while holding the additive. It is noted that the rotation roller 634 may have the same configuration as the rotation roller 181 of the above-described first embodiment.

In the present embodiment, the vehicle 61 is fixed by a vehicle restraining device 66 installed on the floor surface 71 in a state where the tire 5 of the vehicle 61 is placed on the exposed portion 628 of the roller 622. In this state, the roller application device 63 is fixed to the floor surface 71 such that the roller surface of the rotation roller 634 is in contact with the tire 5 of the vehicle 61. After this, when the transmission of the vehicle 61 is set to neutral, and the tire 5 goes into a free state, the motor 621 is driven by the control device 64.

When the motor 621 is driven by the control device 64, and the roller 622 is rotated in the rotation direction D21, the tire 5 is passively rotated in a rotation direction D22 opposite to the rotation direction D21 by the driving force transmitted from the exposed portion 628 of the roller 622. When the tire 5 is rotated in the rotation direction D22, the rotation roller 634 is passively rotated in the rotation direction D21 opposite to the rotation direction D22 by the driving force transmitted from the outer peripheral surface of the tread portion 5A. When the rotation roller 634 is passively rotated, a portion of the roller surface that had been soaked in the liquid in the storage case 631 reaches, while holding the additive, a position where it contacts the tread portion 5A. This allows the additive to be applied from the roller surface of the rotation roller 634 to the tread portion 5A.

With the above-described configuration of the tire repairing apparatus 60, the tire 5 with the wheel 6 mounted on the vehicle 61 is rotated by the idle rotation drive device 62, thereby it is possible to apply the additive to the entire region of the outer peripheral surface of the tread portion 5A in a reliable manner. In addition, it is possible to cause the additive to permeate into the tread portion 5A without removing the tire 5 from the vehicle 61. As a result, it is possible to soften the tread portion 5A and improve the tire performance such as the grip performance and the weatherability of the tire 5.

The invention claimed is:

1. A tire processing apparatus comprising:
   a support supporting a tire; and
   an applicator configured to soften a rubber component of a tread portion of the tire by applying a softening agent having a softening effect that softens the tread portion and causing the softening agent to permeate into the tread portion, wherein
   the support supports the tire in such a manner that the tire can rotate in a circumferential direction of the tire,
   the tire processing apparatus further comprises a motor that rotates the tire in the circumferential direction,
   the applicator includes a contact member that applies the softening agent by coming in contact with a part of an outer peripheral surface of the tread portion when the tire is rotated in the circumferential direction by the motor, and
   wherein the applicator includes a presser configured to press a contact surface of the contact member against the tread portion.

2. The tire processing apparatus according to claim 1, further comprising a heater configured to heat the tread portion.

3. The tire processing apparatus according to claim 2, wherein the heater is provided in a vicinity of the applicator.

4. The tire processing apparatus according to claim 3, wherein in a case where the tire is rotated in a predetermined rotational direction, the heater is provided upstream of and adjacent to the applicator in the rotational direction.

5. The tire processing apparatus according to claim 1, wherein the contact member is a roller member that is rotatably supported in a state of being in contact with the tread portion and is passively rotated by coming in contact with the tread portion of the tire that is rotated.

6. The tire processing apparatus according to claim 1, wherein the presser is a biaser configured to bias the contact member toward the tread portion.

7. The tire processing apparatus according to claim 1, wherein the presser is an elastic member that is provided at the contact member and is compressed by coming in contact with the tread portion.

8. The tire processing apparatus according to claim 1, further comprising a storage that stores the softening agent, wherein the contact member is configured to convey the softening agent from the storage to the tread portion.

9. A tire repairing apparatus comprising:
   an idle rotator configured to idle-rotate a tire mounted on a vehicle; and
   an applicator configured to soften a rubber component of a tread portion of the tire by applying a softening agent having a softening effect that softens the tread portion to the tread portion of the tire rotated by the idle rotator and causing the softening agent to permeate into the tread portion, wherein
   the support supports the tire in such a manner that the tire can rotate in a circumferential direction of the tire,
   the tire processing apparatus further comprises a motor that rotates the tire in the circumferential direction,
   the applicator includes a contact member that applies the softening agent by coming in contact with a part of an outer peripheral surface of the tread portion when the tire is rotated in the circumferential direction by the motor, and
   wherein the applicator includes a presser configured to press a contact surface of the contact member against the tread portion.

10. A tire repairing method to restore a hardened tread portion of a tire, the tire repairing method comprising:
    using a support to support the tire in such a manner that the tire can rotate in a circumferential direction of the tire;
    imparting a rotational driving force to the tire, thereby rotating the tire in the circumferential direction of the tire; and
    softening a rubber component of a tread portion of a tire after vulcanizing molding by applying a softening agent having a softening effect to the tread portion and causing the softening agent to permeate the tread portion,
    wherein the softening agent is applied with an applicator to an entire region of an outer peripheral surface of the tread portion by causing a contact member holding the softening agent to come in contact with a part of the outer peripheral surface of the tread portion of the tire that is rotated, and wherein the applicator includes a presser configured to press a contact surface of the contact member against the tread portion.

11. The tire repairing method according to claim 10, wherein in the imparting a rotational driving force to the tire, an idle rotator idle-rotates the tire mounted on a vehicle.

12. The tire repairing method according to claim 10, further comprising heating the tread portion, wherein the additive is applied to the tread portion heated by the heating.

13. A tire manufacturing method comprising:

using a support to support the tire in such a manner that the tire can rotate in a circumferential direction of the tire;

imparting a rotational driving force to the tire, thereby rotating the tire in the circumferential direction of the tire; and softening a rubber component of a tread portion of a tire after vulcanizing molding by applying a softening agent having a softening effect to the tread portion and causing the softening agent to permeate the tread portion, wherein the softening agent is applied with an applicator to an entire region of an outer peripheral surface of the tread portion by causing a contact member holding the softening agent to come in contact with a part of the outer peripheral surface of the tread portion of the tire that is rotated, and wherein the applicator includes a presser configured to press a contact surface of the contact member against the tread portion.

* * * * *